न/ए

United States Patent [19]

Fyvie et al.

[11] Patent Number: 5,043,203

[45] Date of Patent: Aug. 27, 1991

[54] METHOD FOR MAKING END-CAPPED POLYCARBONATES FROM BISPHENOL MONOCHLOROFORMATE POLYCARBONATE OLIGOMERS WITH PH CONTROL SYSTEM

[75] Inventors: Thomas J. Fyvie, Schenectady; James M. Silva, Clifton Park, both of N.Y.

[73] Assignee: General Electric Company, Schenectady, N.Y.

[21] Appl. No.: 519,979

[22] Filed: May 7, 1990

[51] Int. Cl.$^5$ .............................................. C08G 64/20
[52] U.S. Cl. ..................... 528/198; 526/59; 526/60; 528/371; 528/372
[58] Field of Search ............... 528/198, 371, 372; 526/59, 60

[56] References Cited

U.S. PATENT DOCUMENTS

| | | | |
|---|---|---|---|
| 3,193,528 | 7/1965 | Miller et al. | 260/47 |
| 3,254,051 | 5/1966 | Schmitt | 260/47 |
| 3,974,126 | 8/1976 | Narita et al. | 260/47 |
| 4,038,252 | 7/1977 | Vernaleken et al. | 260/47 |
| 4,367,330 | 1/1983 | Hucks et al. | 528/196 |
| 4,737,573 | 4/1988 | Silva et al. | 528/371 |
| 4,743,676 | 5/1988 | Silva et al. | 528/371 |

*Primary Examiner*—Harold D. Anderson
*Attorney, Agent, or Firm*—William A. Teoli; James C. Davis, Jr.; William H. Pittman

[57] ABSTRACT

Aromatic polycarbonates are prepared by initially phosgenating a mixture of bisphenol and aqueous alkali metal hydroxide under interfacial reaction conditions to form an oligomeric bisphenol monochloroformate followed by the further introduction of phosgene and base and thereafter the elimination of reacted phosgene and the incorporation of endcapping phenol and tertiary organic amine and additional alkali metal hydroxide into the mixture. Reduced phosgene usage, the substantial elimination of emulsion formation, increased pH measurement accuracy and avoidance of production of diarylcarbonates are substantially provided.

7 Claims, No Drawings

METHOD FOR MAKING END-CAPPED POLYCARBONATES FROM BISPHENOL MONOCHLOROFORMATE POLYCARBONATE OLIGOMERS WITH PH CONTROL SYSTEM

CROSS REFERENCE TO RELATED APPLICATIONS

Reference is made to copending application 07/519,980, filed May 7, 1990 which is assigned to the same assignee as the present invention and incorporated herein by reference.

BACKGROUND OF THE INVENTION

The present invention relates to the method for making end-capped polycarbonates utilizing bisphenol monochloroformate polycarbonate oligomer in combination with a phenol chainstopper.

Prior to the present invention, as shown by Silva et al, U.S. Pat. No. 4,743,676, polycarbonates were prepared by reacting a bischloroformate composition with a monohydroxy aromatic compound in a mixture comprising water, base and a suitable organic liquid, and then converting the resulting partially capped bischloroformate composition to linear polycarbonate by contact with an interfacial polycarbonate formation catalyst in an alkaline medium. Although the method of Silva et al resulted in linear polycarbonates of controlled molecular weight, about half of the bisphenol bischloroformate composition end groups had to be hydrolyzed prior to condensation and formation of polymer. In addition to being hydrolysis limited, the bisphenol bischloroformates, as a result of such hydrolysis requirement, can form by-products, such as carbon dioxide and carbonate salts which require extra water to prevent salt precipitation. In addition, amine/chloroformate complexes, such as, acylammonium salts are formed in excess quantities. These acylammonium salts are surface active and can cause excess emulsification during polymerization. Such emulsions interfere with the efficiency of polycarbonate formation.

In U.S. Pat. Nos. 3,193,528 Miller et al, and 3,354,051 Schmitt, methods are described for preparing monochloroformates of bisphenols or mixtures of bisphenols utilizing phosgene, a bisphenol and dilute aqueous caustic. In copending application RD-19,525, an interfacial method is described for making bisphenol monochloroformate polycarbonate oligomers and a product obtained therefrom. There is shown in RD-19,525, a method of making bisphenol monochloroformate polycarbonate oligomers comprising a mixture of substantially equal molar amounts of bisphenol monochloroformate oligomers having a chloroformate end group and a hydroxyl end group in combination with a substantially equivalent amount of a mixture of bishydroxy terminated bisphenol polycarbonate oligomers and bisphenol bischloroformate oligomers. The aforementioned bisphenol monochloroformate polycarbonate oligomers can be made by phosgenating a mixture of bisphenol under interfacial conditions where the mixtures contain sufficient alkali metal hydroxide to provide a pH of up to about 11.2. As the phosgenation continues, the pH of the mixture continues to drop until a pH set point, for example 8, is reached. Additional make-up aqueous alkali metal hydroxide can be introduced at various rates, until a signal is shown indicating bisphenol monochloroformate oligomer formation whereupon termination of base and phosgene introduction can be effected. If a particular control system is used, for example "Control System A", aqueous alkali metal hydroxide can be introduced into the phosgenation mixture at a rate which substantially maintains the pH of the mixture at the pH set point during phosgenation until a sudden rise in base demand occurs. Alternatively, a "Control System B" can be used which restricts the aqueous alkali metal hydroxide introduction to a rate sufficient to provide a ratio of the rate of moles of aqueous alkali metal hydroxide introduction to the rate of moles of phosgene introduction having a value of up to about 2.5. With Control System B, the pH of the phosgenation mixture is found to cycle around the pH set point until it is found to substantially stabilize and thereafter suddenly falls to at least 1 pH unit below its previous stabilized value. These signals identifying either a change in pH or base flow into the phosgenation mixture establish the threshold point of bisphenol monochloroformate polycarbonate oligomer formation and the point at which phosgenation and base introduction can be terminated.

It would be desirable therefore to provide a method for making end-capped polycarbonates having a predetermined molecular weight without excess emulsification occurring during polymerization. It also would be desirable to use a particular ratio of monofunctional phenol chainstopper and the aforedescribed bisphenol monochloroformate polycarbonate oligomer, to not only reduce the level of emulsion formation but also to reduce the phosgene requirement, by-product diphenyl carbonate formation, and to increase the accuracy of the pH measurement during polymerization.

SUMMARY OF THE INVENTION

The present invention is based on the discovery that end-capped polycarbonates having a predetermined molecular weight can be made without excess emulsification occurring by utilizing a particular ratio of phenol chain stopper with the aforedescribed bisphenol monochloroformate polycarbonate oligomer. In addition, a reduction in excess phosgene usage and by-product diphenyl carbonate formation is also realized. Further, increased accuracy of the pH measurement during polymerization is also obtained.

STATEMENT OF THE INVENTION

There is provided by the present invention, a method for making polycarbonate having a ratio of condensed phenolic endcapping units to condensed bisphenol carbonate units having a value from about 0.005 to 0.08, which comprises (1) introducing phosgene into an agitated mixture comprising bisphenol at a temperature of 15° to 50° C. under interfacial reaction conditions and a pH between about 3.0 to about 11.2, (2) continuing the phosgenation of the mixture of (1) and allowing the further introduction of aqueous alkali metal hydroxide to proceed in accordance with a previously established set point between pH 3–10.5 using either a pH Control System A which allows the introduction of aqueous alkali metal hydroxide at a rate sufficient to substantially maintain the mixture at the previously established pH set point, or a pH Control System B, which allows the introduction of aqueous alkali metal hydroxide at a rate sufficient to provide an introduction rate ratio of moles of aqueous alkali metal hydroxide, to moles of phosgene having a value of up to about 2.5, (3) allowing the introduction of aqueous alkali metal hydroxide to proceed in accordance with (2) until a sudden increase in base demand is noted with Control System A or a sudden decrease in pH of at least one unit is noted with respect to Control System B, (4) continuing the introduction of phosgene and alkali metal hydroxide in accordance with (3), until an additional 0.0025 to 0.09 mol of phosgene, per mol of bisphenol is introduced, (5) discontinuing the introduction of phosgene and alkali metal hydroxide, while continuing to agitate the resulting mixture until the mixture is substantially free of phosgene, while the pH is maintained between about 4 to 8, (6) introducing sufficient endcapping phenol into the mixture of (5) to provide the aforesaid mole ratio of condensed phenolic end capping units to condensed bisphenol carbonate units followed by or along with tertiary organic amine to provide a proportion of from about 0.05 to 2 mole of tertiary organic amine, per 100 mol of bisphenol, and sufficient alkali metal hydroxide to maintain the pH of the resulting mixture of between about 9 to 12, (7) allowing the polymerization of the bisphenol monochloroformate oligomer to proceed, and (8) recovering phenolic end-capped polycarbonate from the mixture of (7)

Bisphenols which can be used in the practice of the present invention to make the phenol end capped polycarbonates of the present invention are for example.
resorcinol
4-bromoresorcinol
hydroquinone
4,4'-dihydroxybiphenyl
1,6-dihydroxynaphthalene
2,6-dihydroxynaphthalene
bis(4-hydroxypenyl)methane
bis(4-hydroxyphenyl)diphenylmethane
bis(4-hydroxyphenyl)-1-naphthylmethane
1,1-bis(4-hydroxyphenyl)ethane
1,2-bis(4-hydroxyphenyl)ethane
1,1-bis(4-hydroxyphenyl)-1-phenylethane
2,2-bis(4-hydroxyphenyl)propane ("bisphenol A")
2-(4-hydroxyphenyl)-2-)3-hydroxyphenyl)propane
2,2-bis(4-hydroxyphenyl)butane
1,1-bis(4-hydroxyphenyl)isobutane
1,1-bis(4-hydroxyphenyl)cyclohexane
1,1-bis(4-hydroxyphenyl)cyclododecane
trans-2,3-bis(4-hydroxyphenyl)-2-butene
2,2-bis(4-hydroxyphenyl)adamantane
$\alpha,\alpha'$-bis(4-hydroxyphenyl)toluene
bis(4-hydroxyphenyl)acetonitrile
2,2-bis(3-methyl-4-hydroxyphenyl)propane
2,2-bis(3-ethyl-4-hydroxyphenyl)propane
2,2-bis(3-n-propyl-4-hydroxyphenyl)propane
2,2-bis(3-isopropyl-4-hydroxyphenyl)propane
2,2-bis(3-sec-butyl-4-hydroxyphenyl)propane
2,2-bis(3-t-butyl-4-hydroxyphenyl)propane2,2-Bis(3-cyclohexyl-4-hydroxyphenyl)propane
2,2-bis(3-allyl-4-hydroxyphenyl)propane
2,2-bis(3-methoxy-4-hydroxyphenyl)propane
2,2-bis(3,5-dimethyl-4-hydroxyphenyl)propane
2,2-bis(2,3,5,6-tetramethyl-4-hydroxyphenyl)propane
2,2-bis(3-5-dichloro-4-hydroxyphenyl)propane
2,2-bis(3,5-dibromo-4-hydroxyphenyl)propane
2,2-bis(2,6-dibromo-3,5-dimethyl-4-hydroxyphenyl)-propane
$\alpha,\alpha$-bis(4-hydroxyphenyl)toluene
$\alpha,\alpha,\alpha',\alpha'$-Tetramethyl-$\alpha,\alpha'$-bis(4-hydroxyphenyl)-p-xylene
2,2-bis(4-hydroxyphenyl)hexafluoropropane
1,1-dichloro-2,2-bis(4-hydroxyphenyl)ethylene
1,1-dibromo-2,2-bis(4-hydroxyphenyl)ethylene
1,1-dichloro-2,2-bis(5-phenoxy-4-hydroxyphenyl)ethylene
4,4'-dihydroxybenzophenone
3,3-bis(4-hydroxyphenyl)-2-butanone
1,6-bis(4-hydroxyphenyl)-1,6-hexanedione
ethylene glycol bis(4-hydroxyphenyl)ether
bis(4-hydroxyphenyl)ether
bis(4-hydroxyphenyl)sulfide
bis(4-hydroxyphenyl)sulfoxide
bis(4-hydroxyphenyl)sulfone
bis(3,5-dimethyl-4-hydroxyphenyl)sulfone
9,9-bis(4-hydroxyphenyl)fluorene
2,7-dihydroxypyrene
6,6'-dihydorxy-3,3,3',3'-tetramethylspiro(bis)indane("-spirobiindane bisphenol")
3,3-bis(4-hydroxyphenyl)phthalide
2,6-dihydroxydibenzo-p-dioxin
2,6-dihydroxythianthrene
2,7-dihydroxyphenoxathiin
2,7-dihydroxy-9,10-dimethylphenazine
3,6-dihydroxydibenzofuran
3,6-dihydroxydibenzothiophene
2,7-dihydroxycarbazole In the practice of the present invention, the phenol end-capped polycarbonate can be made by initially preparing a bisphenol monochloroformate polycarbonate oligomer. A reaction mixture is prepared by blending a bisphenol, with an organic solvent, such as methylene chloride, and optionally with a tertiary organic amine, for example, triethylamine, water and about 0.0-0.2 mol of alkali metal hydroxide, for example, sodium hydroxide, per mol of bisphenol. Sufficient alkali metal hydroxide can be utilized to raise the pH of the bisphenol reaction mixture, prior to phosgenation, to a value of about 11 resulting in the dissolution of some of the bisphenol into the aqueous phase. There also can be utilized from about 0 to 200 parts per million of a tertiary organic amine, such as triethylamine, relative to the weight of the organic solvent used in the formulation. Suitable organic solvents which can be used are for example, aliphatic hydrocarbons, such as hexane and heptane; chlorinated aliphatic hydrocarbons, such as methylene chloride, chloroform, carbon tetrachloride, dichloroethane, trichloroethane, tetrachloroethane, dichloropropane and 1,2-dichloroethylene; aromatic hydrocarbons, such as benzene, toluene and xylene; substituted aromatic hydrocarbons such as, chlorobenzene, odichlorobenzene, the various chlorotoluenes, nitrobenzene, and acetophenone; and carbon disulfide. The chlorinated aliphatic hydrocarbons, especially methylene chloride, are preferred.

Aqueous alkali, or alkaline earth metal hydroxide can be used to maintain the pH of the phosgenation mixture near the pH set point, which may be in the range of between about 3 to about 10.5. Some of the alkali metal or alkaline earth metal hydroxides, which can be employed are for example, sodium hydroxide, potassium hydroxide, and calcium hydroxide. Sodium and potassium hydroxides, and particularly sodium hydroxide is preferred. The concentration of the alkali hydroxide solution which is utilized is not critical and can be between about 0.2–19 M. Aqueous metal hydroxide alkali concentrations of at least 5M are preferred.

The bisphenol polycarbonate monochloroformate oligomer forming reaction can be conducted in a wide variety of either semi-batch or continuous reactors. Such reactors are, for example, stirred tank reactors, which may be either semi-batch or continuous flow. Additional reactors which are included are agitated column and recirculating loop continuous reactors.

The volume ratio of aqueous to organic phase during and at the termination of the phosgenation reaction can be in the range of about 0.2–1:1. Reaction temperatures can be in the range of between about 15°–50° C. When the preferred organic liquid is utilized, such as methylene chloride, the reaction may be conducted at reflux which can be 35°–42° C. The reaction can be conducted at atmospheric pressures, although sub- or superatmospheric pressures may be employed if desired.

During phosgenation, the mixture is agitated, such as, by using a stirrer or other conventional equipment. The phosgenation rate can vary from between about 0.02–0.2 mol of phosgene, per mol of bisphenol per minute.

During phosgenation, the pH is maintained at a desired value, frequently termed the pH set point, for example 8, which is chosen from the range of about 3 to about 10.5. A pH set point value above about 8 is desirable for making oligomeric monochloroformate mixtures that will be utilized in making linear polymer. One pH control method is to add aqueous alkali metal hydroxide to maintain the pH near the pH set point, at a maximum rate of about 2–2.5 mol NaOH/min per mole $COCl_2$/min (Control System B). For example, an on/off pH control technique can be used. Aqueous alkali metal hydroxide is added whenever the pH of the system falls below the pH set point, at a rate of about 2.0 to 2.5 mol NaOH/min per mol $COCl_2$/min. This on/off pH control technique can result in pH cycles in which the pH overshoots the set point by about 0.3–1 unit after the base pump is shut off and undershoots the set point by 1–2 units after the base pump is turned on. After at least about 0.6 mol $COCl_2$ per mol bisphenol has been added, the pH of the system stabilizes at a level of about 0.1–0.5 pH units below the pH set point, during which time the base pump is on continuously. The presence of a substantially monochloroformate composition is indicated when the pH of this system suddenly decreases at least 1 pH unit below the previously stabilized value. A second pH control method is to add aqueous alkali metal hydroxide to maintain the pH near the pH set point, at a maximum rate of at least about 3 and preferably at least about 4 mol NaOH/min per mol $COCl_2$/min (Control System A). This pH control technique can also result in fluctuating alkali metal hydroxide flow rates; however a moving average of the alkali metal hydroxide flow rate is substantially constant during the major part of the reaction, followed by a period of monotonically increasing flow rate. The period of the moving average is preferably about one alkali metal hydroxide flow rate cycle in duration. The presence of substantially monochloroformate oligomer composition is signalled when the molar ratio of aqueous alkali metal hydroxide flow (moving average) to phosgene flow exceeds about 2.5–3.5, preferably about 3.

After the bisphenol monochloroformate polycarbonate oligomer is formed additional phosgene and alkali metal hydroxide are introduced followed by termination of phosgene and alkali metal hydroxide introduction and agitation of the mixture to effect the removal of dissolved phosgene. Agitation can be effected either by mechanical means, such as a stirrer, or by the introduction of an inert gas, such as nitrogen.

Endcapping phenol for monohydroxy aromatic compound, such as phenol, p-t-butylphenol, p-cumyphenol, octylphenol, nonylphenol can be introduced into the mixture in the amounts sufficient to provide the desired molecular weight of the polycarbonate. A tertiary organic amine, such as, triethylamine or any trialkyl amine in which the alkyl group contains up to about 6 carbon atoms can also be introduced into the mixture either along with the endcap or after all of the endcap has been added. However, trialkyl ammonium and phosphonium salts and amidines of the type in the art known to be effective in the reaction of phosgene with bisphenols also can be used if desired. There can be used from about 0.05 moles to about 2 moles of tertiary organic amine per 100 moles of the bisphenol for effective results along with sufficient alkali metal hydroxide to maintain a pH of between about 9 to 12. As a result of introduction of the phenol endcapper after the elimination of excess phosgene from the mixture, the formation of diarylcarbonate is substantially reduced.

In order to avoid premature precipitation of alkali metal salt, such as sodium chloride in particular instances, there can be added along with or prior to polymerization catalyst addition, sufficient water if necessary to preclude a build-up in salt concentration exceeding 25% by weight of the aqueous phase.

Recovery of the polymer can be achieved by conventional means, such as decanting the reaction mixture from the solids, or by stripping under reduced pressure.

In order that those skilled in the art will be better able to practice the present invention, the following example is given by way of illustration and not by way of limitation.

EXAMPLE 1

There was charged to a reactor, 186 grams (0.816 moles) of bisphenol A, 550 ml of methylene chloride, 250 ml of water, 5 ml of an aqueous 50 weight percent sodium hydroxide solution and 0–200 ppm of triethylamine based on the weight of methylene chloride. There was used a one liter reactor which was fitted with a dual turbine blade agitator, condenser, a phosgene addition dip tube, a sodium hydroxide addition dip tube, and a pH electrode in a recirculation loop. The pH controller turned on and off a pump which was set to deliver a sodium hydroxide flow rate of about twice the molar phosgene flow rate. The phosgenation rate was 5.8 grams/min., for 14.5 and 15.2 minutes (1.03–1.10 mole $COCl_2$/mol BPA). The sodium hydroxide pump was set to deliver a 50 weight percent of sodium hydroxide (19M) at 6.7 ml/min.

A series of phosgenations (1–3) was run using the above apparatus with various triethylamine levels. For each phosgenation, the pH set point was 8.2. After the phosgenation was complete, as shown by a pH dip of at least 1 pH unit after the pH of the mixture remained substantially constant at about 8.0, followed by an additional phosgenation period to ensure sufficient chloroformate content to enable fully capped polymer, a sample was taken immediately and analyzed by HPLC. For comparison, a predominantly bischloroformate product (4–6) was made by utilizing higher levels of phosgene (1.3 moles $COCl_2$/mol BPA). The following results were obtained, where Et₃N is triethylamine, CF is chloroformate, and DP is average number of condensed units:

TABLE 1

| phosgenations | Oligomerization | | | Number Avg DP |
|---|---|---|---|---|
| | ppm Et₃N | mol COCl₂ / mol BPA | mol OH ends / mol CF ends | |
| 1 | 0 | 1.08 | 0.87 | 3.3 |
| 2 | 50 | 1.06 | 0.74 | 4.2 |
| 3 | 100 | 1.03 | 0.93 | 6.6 |
| 4 | 0 | 1.30 | 0.09 | 5.3 |
| 5 | 25 | 1.30 | 0.23 | 4.6 |
| 6 | 50 | 1.30 | 0.27 | 7.4 |

The above results show that a lower ratio of phosgene to BPA is required to produce the bisphenol monochloroformate polycarbonate oligomers (1-3). In addition, a higher ratio of hydroxyl end groups to chloroformate end groups is present in the bisphenol monochloroformate oligomer as compared to the bischloroformate oligomer (4-6).

The above bisphenol monochloroformate and bischloroformate polycarbonate oligomer mixtures were then separately polymerized after each mixture had been sufficiently stirred to effect removal of any unreacted phosgene as determined by phosgene detection paper. For example, there were added to each of the mixtures, 3.456 grams (4.5 mole)% of phenol as a methylene chloride solution along with 170 ml of distilled water and enough triethylamine catalyst was added to bring the total amine level to 0.5 mole based on bisphenol A.

As soon as the triethylamine was added, sodium hydroxide was also added as a 50 weight % solution at a rate of 5.3 ml/min under pH control, with a set point of 9. As the pH exceeded the set point, the sodium hydroxide solution was automatically shut off. It was found, however, that attempts to polymerize the bischloroformate oligomer shown below in Table 2 as 4-6 were not feasible because an emulsion formed resulting in a significant thickening of the reaction mixture which resulted in an inaccurate pH reading. As a result, characterization of the bischloroformate prior to base addition was necessary to ascertain the base requirement for polymerization; the calculated amount of aqueous sodium hydroxide was then added at a constant flow rate over a period of 5 minutes, which superseded the automatic pH control system.

The various polymerization mixtures were analyzed after the completion of the capping/polymerization reaction for molecular weight distribution as well as residual bisphenol A. All samples had less than 50 ppm BPA (relative to polymer). The results of the analyses are shown below in Table 2,

TABLE 2

| Example | Polymerization | | | | |
|---|---|---|---|---|---|
| | Final pH | $M_w$ | $M_w/M_n$ | Emulsion Duration (min) | NaOH# Total (ml) |
| 1 | 10.9 | 21,800 | 2.27 | 0 | 98.4 |
| 2 | 11.4 | 22,800 | 2.35 | 1.5 | 99.4 |
| 3 | 11.5 | 23,000 | 2.40 | 3 | 93.2 |
| 4 | 9.5 | 20,500 | 2.05 | 6 | 129 |
| 5 | 9.9 | 20,400 | 2.17 | 9 | 128 |
| 6 | 10.1 | 21,500 | 2.03 | 5 | 130 |

Total NaOH for phosgenation/capping/polymerization.

The above results show that a significant emulsion problem existed with the bisphenol bischloroformate oligomer mixtures (4-6) as compared to the bisphenol monochloroformate oligomer mixtures (1-3). The polymerization mixtures were also substantially free of diphenyl carbonate. There was also noted a substantially lower aqueous NaOH usage with monochloroformate oligomer as compared to the bischloroformate oligomer mixture.

Although the above example illustrates only a few of the very many variables which can be utilized in the practice of the method of the present invention, it should be understood that the method of the present invention is directed to the production to a much broader variety of aromatic polycarbonates utilizing bisphenol monochloroformate polycarbonate oligomers as set forth in the description preceding these examples.

What is claimed is:

1. A method for making polycarbonate having a ratio of condensed phenolic endcapping units to condensed bisphenol carbonate units having a value from about 0.005 to 0.08, which comprises (1) introducing phosgene into an agitated mixture comprising bisphenol at a temperature of 15° to 50° C. under interfacial reaction conditions and a pH between about 3.0 to about 11.2, (2) continuing the phosgenation of the mixture of (1) and further introducing aqueous alkali metal hydroxide in accordance with a previously established set point between pH 3-10.5 comprising either of pH Control System A which adds aqueous alkali metal hydroxide at a rate sufficient to substantially maintain the mixture at the previously established pH set point, or a pH Control System B, which adds aqueous alkali metal hydroxide at a rate sufficient to provide a ratio of moles of aqueous alkali metal hydroxide, to moles of phosgene having a value of up to about 2.5, (3) allowing the introduction of aqueous alkali metal hydroxide to proceed in accordance with (2) until a sudden increase in base demand is noted with Control System A or a sudden decrease in pH of at least one unit is noted with respect to Control System B, (4) continuing the introduction of phosgene and alkali metal hydroxide in accordance with (3), until an additional 0.0025 to 0.09 mol of phosgene, per mol of bisphenol is introduced, (5) discontinuing the introduction of phosgene and alkali metal hydroxide, while continuing to agitate the resulting mixture until the mixture is substantially free of phosgene, while the pH is maintained between about 4 to 8, (6) introducing sufficient endcapping phenol into the mixture of (5) to provide the aforesaid mole ratio of condensed phenolic end capping units to condensed bisphenol carbonate units followed by or along with tertiary organic amine to provide a proportion of from about 0.05 to 2 mole of tertiary organic amine, per 100 of bisphenol, and sufficient alkali metal hydroxide to maintain the pH of the resulting mixture of between about 9 to 12, (7) polymerizing bisphenol monochloroformate oligomer, and (8) recovering phenolic end-capped polycarbonate from the mixture of (7).

2. A method in accordance with claim 1, where the bisphenol is bisphenol A.

3. A method in accordance with claim 1, wherein the Control System is Control System A.

4. A method in accordance with claim 1, wherein the Control System is Control System B.

5. A method in accordance with claim 1, where the alkali metal hydroxide is sodium hydroxide.

6. A method in accordance with claim 1, where the pH set point is steps 1-4 is 8.2.

7. A method in accordance with claim 1, where there is added in steps 6, 7 or 8, sufficient water to minimize the separating of alkali metal salt from the mixture.

* * * * *